United States Patent
Zhou et al.

(10) Patent No.: US 10,911,677 B1
(45) Date of Patent: Feb. 2, 2021

(54) MULTI-CAMERA VIDEO STABILIZATION TECHNIQUES

(71) Applicant: Apple Inc., Cupertino, CA (US)

(72) Inventors: Jianping Zhou, Fremont, CA (US); Sebastien X. Beysserie, San Jose, CA (US); Tao Zhang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/564,132

(22) Filed: Sep. 9, 2019

(51) Int. Cl.
| | | |
|---|---|---|
| H04N 5/232 | (2006.01) |
| H04N 5/225 | (2006.01) |
| H04N 9/64 | (2006.01) |
| H04N 1/327 | (2006.01) |
| G06T 7/20 | (2017.01) |
| G06T 7/70 | (2017.01) |
| G02B 27/64 | (2006.01) |
| G03B 17/00 | (2006.01) |

(52) U.S. Cl.
CPC .......... *H04N 5/23267* (2013.01); *G06T 7/70* (2017.01); *H04N 5/2258* (2013.01); *G06T 2207/10016* (2013.01); *G06T 2207/30244* (2013.01)

(58) Field of Classification Search
CPC .......... H04N 5/23267; H04N 5/23228; H04N 5/2258; H04N 1/327; H04N 1/32789; H04N 1/32791; H04N 9/646; H04N 7/00; G06T 5/00; G06T 5/001; G06T 7/70; G06T 7/20; G06T 2207/10016; G06T 2207/30244; G02B 27/646; G03B 17/00

USPC ....... 348/208.6, 208.99, 208.1, 208.2, 208.3, 348/208.11, 208.14, 241, 239, 429.1; 382/254, 255, 264, 164, 171, 173; 396/52, 55, 53, 13, 421
See application file for complete search history.

(56) References Cited

U.S. PATENT DOCUMENTS

| | | | | |
|---|---|---|---|---|
| 8,213,681 | B2 * | 7/2012 | Nobori ..................... | G06K 9/00 382/103 |
| 8,363,902 | B2 * | 1/2013 | Nobori ..................... | G06K 9/00 382/107 |
| 9,560,268 | B2 * | 1/2017 | Sonot .................. | H04N 21/2187 725/105 |
| 10,354,407 | B2 * | 7/2019 | Lablans ........ | G06T 2207/30196 348/47 |
| 2006/0099237 | A1 * | 5/2006 | Steinberg ........... | H04N 5/23258 358/302 |
| 2006/0119710 | A1 * | 6/2006 | Ben-Ezra ............... | H04N 5/228 348/208.99 |

(Continued)

*Primary Examiner* — Marly S Camargo
(74) *Attorney, Agent, or Firm* — Blank Rome LLP

(57) ABSTRACT

Various techniques are disclosed herein, which comprise obtaining a first stream of images from a first camera and a second stream of images from a second camera, wherein the first camera and second camera have different poses, and at least a portion of the image streams are captured concurrently. Next, a first stabilized trajectory and corresponding set of corrections used to stabilize the first stream of images are calculated. Based on determined differences between the poses of the first camera and second camera during the capture of the first and second streams of images, a second set of corrections to be applied to the second stream of images are derived to match the first stabilized trajectory. If desired, e.g., in response to determining that the stabilized first stream of images does not meet a stabilization criterion, the second stream of images may be stabilized using the second set of corrections.

20 Claims, 7 Drawing Sheets

(56) References Cited

U.S. PATENT DOCUMENTS

| | | | |
|---|---|---|---|
| 2007/0065130 A1* | 3/2007 | Fukumoto | G03B 17/00 396/55 |
| 2014/0132784 A1* | 5/2014 | Chouly | H04N 5/23254 348/208.14 |
| 2019/0228232 A1* | 7/2019 | Lecart | G06T 2207/30252 382/103 |

* cited by examiner

MULTI-CAMERA VIDEO STABILIZATION TECHNIQUES

TECHNICAL FIELD

This disclosure relates generally to the fields of digital photography and digital videography. More particularly, but not by way of limitation, it relates to techniques for improved stabilization of video image streams, e.g., stabilization of image streams captured by multi-camera electronic image capture devices.

BACKGROUND

With the application of software-based and/or hardware-based stabilization technology, jitter caused by camera movement may be minimized, making it possible to transform shaky, handheld footage into steady, smooth shots. One way to stabilize a video is to track a salient feature(s) in the image and use this as an anchor point to cancel out all perturbations relative to it. This approach requires a priori knowledge of the image's content to, for example, identify and track a person or other salient object in the scene. Another approach to image stabilization searches for a "background plane" in a video sequence and uses its observed distortion to correct for camera motion. In yet another approach, known as optical image stabilization (OIS), gyroscopically-controlled electromagnets shift a floating lens element orthogonally to the optical axis along the horizontal and vertical plane of the image in a direction that is opposite that of the camera movement. Doing this can effectively neutralize any sign of camera shake. In a similar type of operation, a camera's imaging sensor may be translated in the opposite direction of the camera's movements, e.g., to dampen the effects of camera shake.

Many modern electronic image capture devices have multiple cameras that are capable of capturing and producing stabilized video image streams. However, such multiple cameras of a given electronic image capture device often have very different sets of camera properties, e.g., in terms of field of view (FOV), focal length, OIS systems, zoom capabilities, etc. When each camera's captured images, including any stabilized video image streams produced by a given camera, are processed and/or presented to a user of such image capture device independently, the user experience may suffer, as the results of each camera may not be interchangeable or combinable with one another, e.g., to improve or enhance the images produced by one of the cameras of the electronic image capture device with the images produced by one or more of the other cameras of the electronic image capture device.

In the case of video image stabilization operations, a naïve approach of applying the same set of video image stabilization corrections determined for a first image stream captured by a first camera of an electronic image capture device to a second image stream captured by a second camera of the electronic image capture device will not produce satisfactory results—especially when the two cameras have different configurations and/or poses with respect to the housing of the electronic image capture device. For example, one camera may have OIS, while the other may not. Even if both cameras have OIS, each OIS system may move its respective lens to different positions during the capture of the image streams—even while experiencing the same user hand shake during the capture (e.g., due to the cameras having different pixel sizes, lens travel ranges, OIS strokes, etc.). Moreover, the different poses of the multiple cameras may lead to different views or portions of the scene being captured in the cameras' respective captured images. All these differences may lead to a sudden pop or jump when attempting to switch between the video streams, e.g., stabilized video streams, being produced by the respective cameras of the electronic image capture device, which may also cause the user experience to suffer.

Thus, what is needed are techniques improve the results produced by multi-camera electronic image capture devices, e.g., in the context of stabilizing captured video image streams. In particular, it may be desirable to synchronize the video stabilization operations applied to the image streams captured by at least two of the cameras of the multi-camera electronic image capture device, such that the respective stabilized video image streams may be seamlessly combined (at least in part), switched between, and/or used to replace one another, as may desired for a given user experience, in the production of a resultant stabilized video stream. In some embodiments, it may desirable to maintain roughly the same center of images between various image streams captured by the electronic image capture device. Such techniques are also preferably efficient, e.g., from both computational and power-utilization standpoints.

SUMMARY

Techniques to improve a multi-camera electronic image capture device's ability to stabilize captured video image streams are disclosed herein. The techniques may comprise obtaining a first stream of images from a first camera of the electronic image capture device and a second stream of images from a second camera of the electronic image capture device, wherein the first and second cameras have different poses, and at least a portion of the first and second image streams are captured concurrently. Poses, as used herein, may refer to at least: the position and/or orientation of a camera device, e.g., with respect to the housing of an electronic image capture device in which they are mounted.

Next, the techniques may calculate a first stabilized trajectory and a corresponding set of corrections that may be used to stabilize the first stream of images. In some embodiments, the first stabilized trajectory that is calculated may account for the fact that one or more OIS systems may have already applied some amount of stabilization to the first camera during the capture of the first stream of images (e.g., to cancel out user hand shake), thus the stabilized trajectory that is calculated may have to compensate for any stabilization correction already physically applied to the first camera unit directly by the OIS systems (i.e., the first stabilized trajectory may not be determined accurately based solely on device movement measurements, as obtained, e.g., from a gyroscope, accelerometer, and/or inertial measurement unit (IMU)). In some embodiments, stabilizing the first stream of images may also comprise performing one or more rolling shutter correction operations on the first stream of images.

Next, one or more differences may be determined between the poses of the first and second cameras during the capture of the first and second streams of images. Based, at least in part, on the differences that are determined between the poses of the first and second cameras, a second set of corrections to be applied to the second stream of images may derived, wherein the second set of corrections are derived to match the calculated first stabilized trajectory. According to some embodiments, the differences between the poses of the first and second cameras may comprise one or more of: camera rotation; optical center; or parallax. In other embodiments, determining the differences between the poses of the first and second cameras may comprise determining: one or more static camera alignment differences between the first camera and the second camera; and/or determining one or more differences in lens position changes caused by respective OIS systems of the first and/or second cameras during the capture of the first and second image streams.

When desired, e.g., in response to a determination being made that the stabilized first stream of images does not meet a first stabilization criterion, the second stream of images may be stabilized using the second set of corrections. In such embodiments, a resultant stabilized video stream may be produced, at least in part, using the stabilized second stream of images. In instances when the first stabilization criterion is met by the stabilized first stream of images, the resultant stabilized video stream may simply comprise the stabilized first stream of images, and the performance of the stabilization operations on the second stream of images may be avoided and/or discarded (e.g., in the event that the stabilized second stream of images had already been produced).

In some embodiments, both the stabilized first stream of images and the stabilized second stream of images may be stored in a common file structure in the electronic image capture device's memory, and users may be given a choice to use either the stabilized first stream of images, the stabilized second stream of images, or a combination of the stabilized first and second streams of images as a resultant stabilized video stream.

Various methods of performing video stabilization for multi-camera electronic image capture devices are also disclosed herein, in accordance with the embodiments enumerated above. Various non-transitory program storage device embodiments are disclosed herein as well, in accordance with the embodiments enumerated above.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Example Multi-Camera Electronic Image Capture Device

Figure 1:
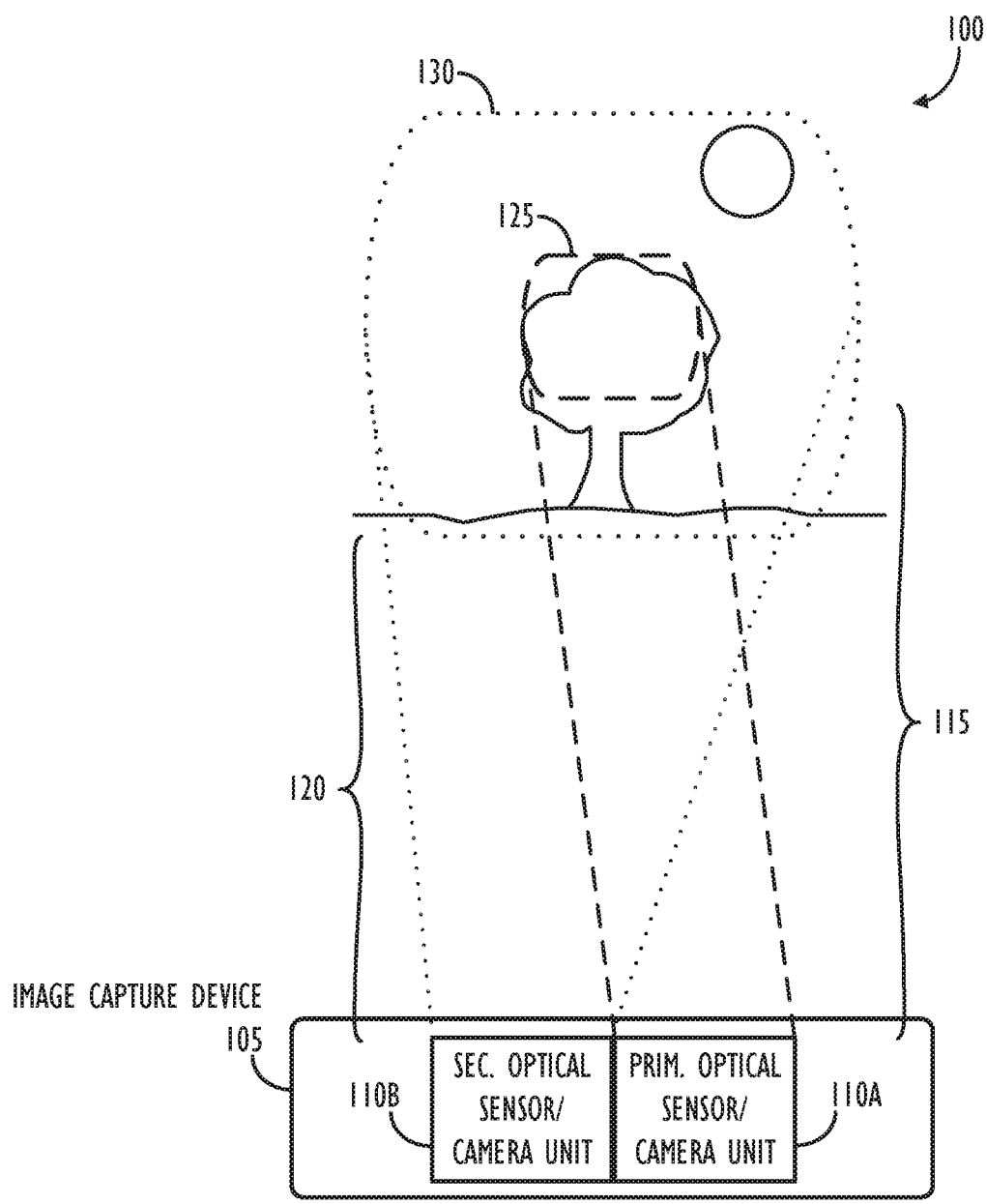
FIG. 1 is a view of an exemplary embodiment of camera module components arranged for multiple visual fields usable for a multi-camera electronic image capture device, according to one or more embodiments.

Turning now to FIG. 1, a view 100 of an exemplary embodiment of camera module components arranged for multiple visual fields usable for a multi-camera electronic image capture device 105 is shown, according to one or more embodiments. A portable multifunction image capture device 105 may include an imaging system, comprising: a first (or "primary") optical sensor/camera unit 110a with a first focal length 115 for capturing a first visual field 125 and a second (or "secondary") optical sensor/camera unit 110b with a second focal length 120 for capturing a second visual field 130.

Some embodiments include a first camera unit 110a of a multi-camera electronic image capture device for capturing a first image of a first visual field 125 ("visual field," as used herein, has a synonymous meaning to "field of view"). A second camera unit 110b of the multifunction image capture device 105 may capture a second image of a second visual field 130. In some embodiments, the first camera unit 110a includes a first optical package with a first focal length 115. In some embodiments, the second camera unit 110b includes a second optical package with a second focal length 120. In some embodiments, the first focal length 115 is different from the second focal length 120, although, in other embodiments, the first focal length 115 may be the same as the second focal length 120. Typically, the multi-camera system is configured to capture the same scene with at least two cameras. Accordingly, in some variations, the first visual field 125 at least partially overlaps the second visual field 130. In some of these variations, the first visual field 125 is a subset of the second visual field 130. In some embodiments, the first image and the second image are preserved to a storage medium as separate data structures.

Some embodiments assign metadata to the first image of the first visual field 125 and the second image of the second visual field 130 that comprises a time indexing feature for establishing that the first image of the first visual field 125 and the second image of the second visual field 130 correspond as having been captured within a particular time frame. In some embodiments, it may be advantageous that the image streams captured by the primary and secondary capture units are time-synchronized, while, in other embodiments, the image streams captured by the primary and secondary capture units need not be tightly time-synchronized. Some embodiments may display the first image of the first visual field 125 on a screen interface of the electronic image capture device, e.g., with a control for switching to display the second image of the second visual field 130, and, responsive to an actuation of the control, display the second image of the second visual field 130 in place of the first image. Some embodiments generate a fused image based, at least in part, from data of the first image of the first visual field 125 and data of the second image of the second visual field 130. In some embodiments, the fused image is generated by enhancing the first image of the first visual field 125 using data from the second image of the second visual field 130. Some embodiments may display the first image of the first visual field 125 and the second image of the second visual field 130 in a shared screen interface. In some embodiments, video streams (e.g., stabilized video streams) may similarly be generated by enhancing one or more images captured by the first camera unit 110a using data from images concurrently captured by the second camera unit 110b.

In some embodiments, the camera system of image capture device 105 includes a processing unit configured to assign to the first image of a first visual field 125 and the second image of a second visual field 130 a time indexing feature for establishing that the first image and the second image were captured within a threshold time of each other. In some embodiments, the first camera unit 110a includes a lens having a folded lens configuration (not shown) with a longer focal length 115 than a focal length 120 of a lens of the second camera unit 110b, and the second visual field 130 is centered on a second visual axis aligned with a first visual axis on which the first visual field 125 is centered. In some embodiments, the first camera unit 110a includes a first moveable lens and a first image sensor attached to a chassis of the first camera unit 110a, and the second camera unit 110b includes a lens and a second image sensor moveably attached a chassis of the second camera unit 110b. In some embodiments, the first camera unit 110a and the second camera unit 110b include a first image processing pipeline and a second image processing pipeline, respectively.

In some embodiments, the first camera unit 110a includes a first fixed lens and a first image sensor moveably attached a chassis of the first camera unit 110a, and the second camera unit 110b includes a second fixed lens and a second image sensor moveably attached a chassis of the second camera unit 110b. In some embodiments, the second camera unit 110b includes a second fixed lens aligned to share use of the first image sensor moveably attached the chassis of the second camera unit 110b.

In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at a point in time, t(0), and the second image is a moving image data structure captured over a time interval that includes time t(0).

In some embodiments, the first image has a first resolution, and the second image has a second resolution. An example of the use of a first image that is a moving image data structure at a first frame rate and a second image that is a moving image data structure at a second frame rate arises in that some embodiments include second camera module 110b recording 720p (also known as 720 pixels of vertical resolution progressive scan) slow motion video at 240 frames per second while, first camera module 110a is capturing 4K (horizontal resolution on the order of 4,000 pixels) video at 30 frames per second.

Single-Camera Video Image Stabilization Techniques

One approach to single-camera video stabilization described herein makes use of a tunable video stabilization strength parameter by first determining what sort of activity is causing the detected camera motion, setting the tuning parameter value accordingly, and stabilizing in accordance with that value. For example, if no motion is detected, it may be possible to classify the type of motion as "stationary" and, as a result, apply very strict stabilization. If, on the other hand, a large amount of camera motion is detected along a single axis, it may be possible to classify the type of motion as "strolling" (i.e., akin to what would be captured if the video was being recorded while the user was walking), at which point a different video stabilization strength value may be applied.

One approach to video stabilization described herein monitors the motion data of each frame, adjusting a stabilization tuning value based on that motion data and the motion data of a specified number of "future" and "past" frames. More specifically, video stabilization operations in accordance with such approaches may buffer some number of incoming video frames, delaying the production of stabilized video output frames by the time required to capture these frames. This arrangement permits a "current frame" to use both "future" and "past" motion data. This, in turn, permits stabilization motion adjustments or corrections (i.e., the movement of individual frames within their overscan region made to stabilize the frame) of a current frame in a way that accounts for the motion in future frames.

Figure 2A:
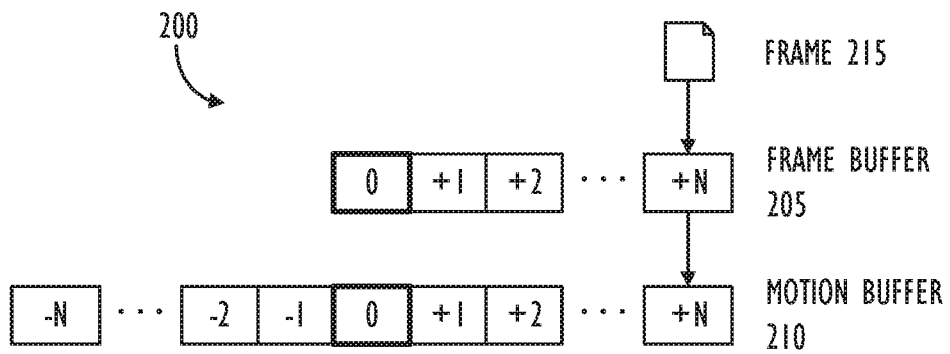
FIGS. 2A and 2B show, in block diagram form, a frame buffer system, in accordance with one or more embodiments.

Referring to FIG. 2A, buffer system 200 in accordance with one embodiment includes (N+1) entry frame buffer 205, and (2N+1) entry motion buffer 210. As each frame 325 arrives, it is placed into the $+N^{th}$ frame buffer entry with the frame's corresponding motion data placed into the $+N^{th}$ motion buffer entry. Frame motion data (e.g., frame metadata) may come from, for example, one or more gyroscopes, IMUs, and/or accelerometers, whose output is matched with, or synchronized to, the capture of video frames (e.g., video frame 315).

Figure 2B:
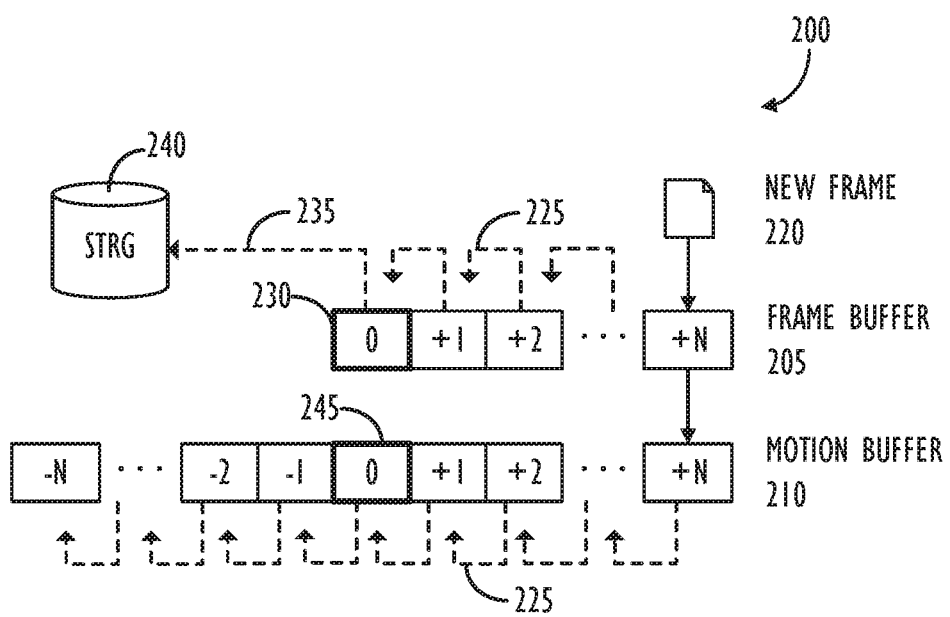

Referring to FIG. 2B, as each new frame 220 arrives at buffer system 200, every entry already in frame buffer 205 and every entry in motion buffer 210 may be shifted to the left by one position, as indicated by dashed lines 225. After being stabilized, frames shifted out of frame buffer entry 230 (the $0^{th}$ entry) may be routed 235 to long-term storage 240. Motion data shifted out of motion buffer entry 245 (i.e., the $-N^{th}$ entry, or, in instances where past motion data is not taken into account, the $0^{th}$ entry) may be discarded or retained. In buffer system 200, for example, motion buffer 210 includes (2N+1) total entries: N entries corresponding to frames captured before frame and motion entry 230 and 245, respectively (i.e., entries having negative indices), and N entries corresponding to frames captured after frame and motion entry 230 and 245, respectively (entries having positive indices). From the point of view of a frame in entry 230, positive-index motion entries correspond to frames captured in the "future" while negative-index entries correspond to frames captured in the "past." The difference in time between the capture of a frame placed into the $+N^{th}$ frame buffer entry and generation of a stabilized version of that frame from entry 330 may be thought of as the duration of time that the stabilization operation is able to look into the "future" for when making its stabilization determinations.

In one embodiment, frame buffer 205 may store a specified number of frames (e.g., 16, 61, 91, etc.). Because buffering frames can be expensive in terms of memory, e.g., one frame at 1080p video resolution can be between 2 and 3 megabytes (MB), the optimum size of frame buffer 205 may be dependent upon the available memory, the amount of delay time that is acceptable between initiation of a video capture operation and generation of a first stabilized output frame, and the intended use of the image capture device. (The size of motion buffer 210 may be small compared to frame buffer 205, as the camera motion data is usually much smaller in size than the corresponding captured image data.)

Once frame 205 and motion 210 buffers have been initialized, an initial video stabilization strength parameter (a) and a current frame may be selected. For the purposes of this disclosure, the "current frame" will be taken as that frame in frame buffer entry 230 (and motion data in motion buffer entry 245). A video stabilization strength parameter may be thought of as a value used, in part, to determine weighting values and/or weighting function used to weight the movement data of one or more other captured image frames in the video sequence in order to determine a resultant stabilization motion to be applied to the current image during stabilization operations.

Figure 4:
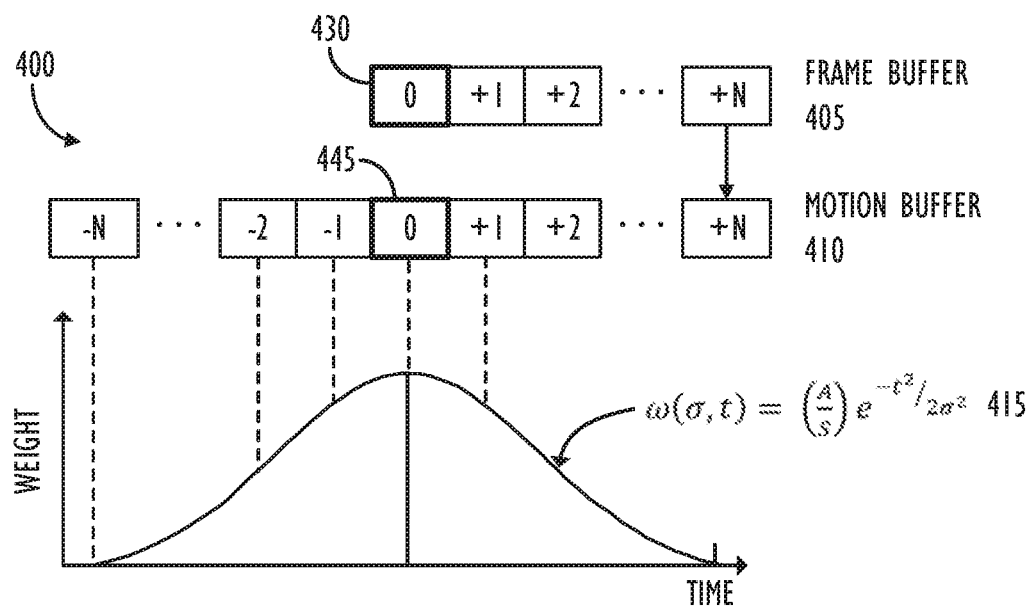
FIG. 4 illustrates a stabilization weighting function, in accordance with one or more embodiments.

In some embodiments, determining the weighting value to be applied to a given frame may entail utilizing a normal (or Gaussian) distribution weighting function that is centered at the current frame and has a desired standard deviation value, which may, e.g., be modulated by the video stabilization strength parameter, as is described in more detail with respect to FIG. 4. The result of such a distribution being used as a weighting function is that the current frame (i.e., the "center" frame in the distribution) will have the largest weight value, and the past and future frames will have proportionally lower weight values, based on how far away in "time" they were captured from the current frame. The term "weighting value" as used herein refers to a weight that is applied to the motion data for a given frame. In other words, the more heavily a given frame is weighted, the more the stabilization process will attempt to move the 'visible frame' (i.e., the portion of the captured frame that is actually encoded into the resultant stabilized video sequence) towards that frame's position. In other words, the stabilization trajectory of the stabilized video sequence will be steered towards the position of those frames that have been assigned a higher weighting value.

Figure 3:
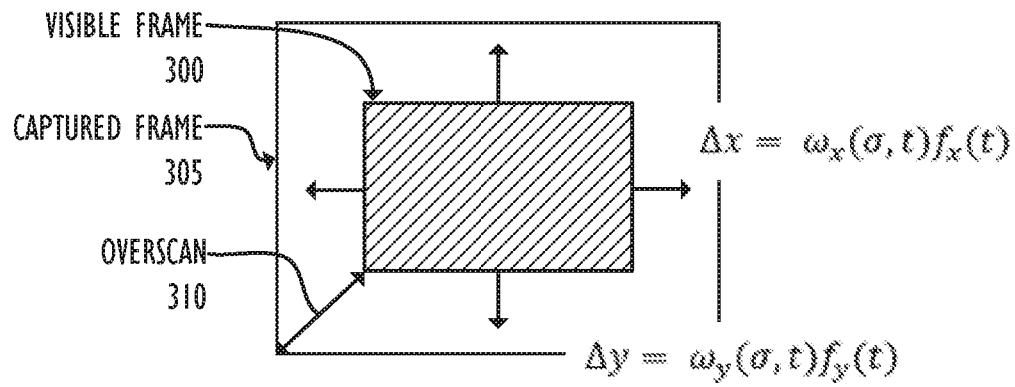
FIG. 3 illustrates the movement that can be applied to a visible region of a frame within its overscan during stabilization operations, in accordance with one or more embodiments.

Referring now to FIG. 3, stabilization motion values for an exemplary captured frame are shown. When performing video image stabilization, adjustments may be made to the location of the visible frame within each captured image frame (e.g., by pushing the visible frame into the frame's overscan region in a particular direction), in order to stabilize the image with respect to the rest of the captured video sequence. The particular adjustments made to stabilize a frame may be determined based, at least in part, on one or more weighting functions that establish a relative weight that the motion data of each frame in an incoming frame buffer may contribute to the determined adjustments of the frame that is currently being stabilized.

As shown in FIG. 3, the stabilization motion of visible frame 300 within captured frame 305 (the difference being overscan 310) is shown with the following functions:

$$\Delta x = \omega_x(\sigma, t) f_x(t) \qquad \text{EQ. 1A}$$

$$\text{and } \Delta y = \omega_y(\sigma, t) f_y(t), \qquad \text{EQ. 1B}$$

where: $\Delta x$ and $\Delta y$ represent the amount of motion along x and y coordinate axes that the current frame should be moved in accordance with a video stabilization operation; $\omega_x(\ )$ and $\omega_y(\ )$ represent x and y coordinate weighting functions respectively; and functions $f_x(\ )$ and $f_y(\ )$ represent arbitrary movement functions (linear or non-linear) that are up to the discretion of the designer. It is to be understood that, while EQS. 1A and 1B describe translation only, actual correction may include other axes and correction for other artifacts caused by device instability during video capture operations. For example, in one embodiment, video may be stabilized using gyroscope output (e.g., represented as quaternions) against rotation, perspective distortion, and rolling shutter artifacts. In addition, multiple corrections to an image at various positions of the image's plane may be made—rather than a single or global correction, as described here. In short, for each current frame, the video stabilization operation may determine the stabilized motion trajectory based on past/future motion data and may determine the correction (difference) that needs to be applied to the frame (e.g., based the frame's respective motion data) to make it equal the stabilized trajectory.

Using this information and known camera and lens characteristics (e.g., focal length), the video stabilization operation may then generate multiple perspective transforms (e.g., translation, rotation, etc.), which may then be applied to the image. (The size of overscan 310 has been enlarged in FIG. 3 for illustrative purposes. Typical sizes for overscan 310 may be between 3% to 10% of a captured frame's horizontal and vertical extents, respectively.) In general, a video stabilization strength parameter, $\sigma$, may vary from image to image and, as a result, weighting values $\omega_x(\ )$ and $\omega_y(\ )$ may also vary from image to image within a given frame buffer.

Referring now to FIG. 4, in one example 400, the video stabilization strength parameter $\sigma$ may be the standard deviation of a Gaussian weighting function 415 (415 could represent either, or both, $\omega_x(\ )$ and $\omega_y(\ )$ of EQS. 1A and 1B). As shown in illustrative weighting function 415, time may correspond to the buffered motion data's index, i.e., ranging from positive N in the "future" direction to negative N in the "past" direction. By way of example, the weight value assigned to the "current image" buffer entry (i.e., time=0, buffer entries 230 and 245) would be the maximum value of function 415. Additional details regarding exemplary video image stabilization schemes that may be applied based on video stabilization strength parameters may be found, e.g., in commonly-assigned U.S. Pat. No. 9,787,902, filed Jun. 10, 2016, and which is hereby incorporated by reference in its entirety.

Multi-Camera Video Image Stabilization Synchronization Techniques

Figure 5:
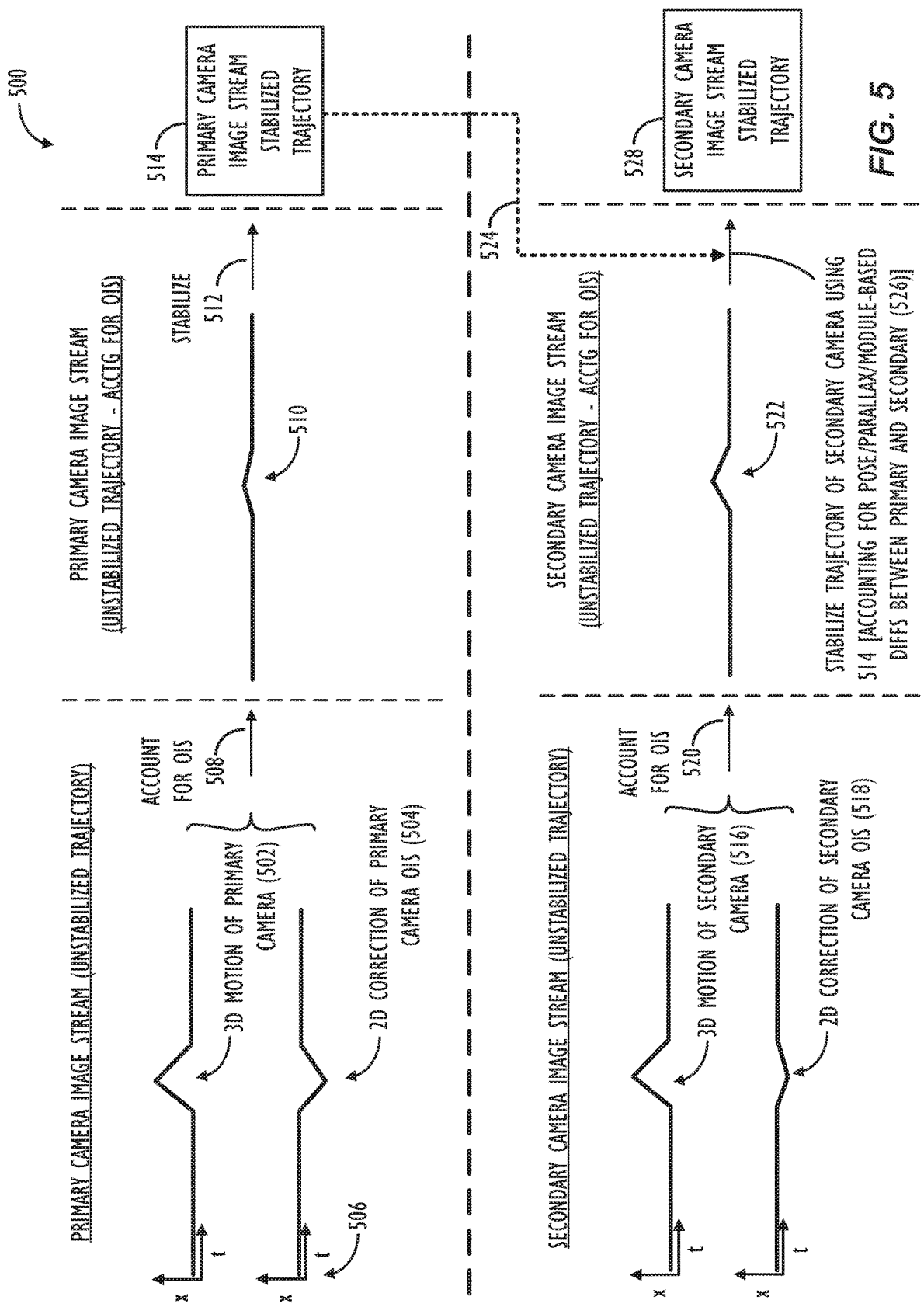
FIG. 5 illustrates exemplary multi-camera electronic image capture device video stabilization techniques, in accordance with one or more embodiments.

Referring now to FIG. 5, exemplary multi-camera electronic image capture device video stabilization techniques 500 are illustrated, in accordance with one or more embodiments. Beginning in the upper-left portion of FIG. 5, graph 502 represents the three-dimensional (3D) motion of a primary camera of the electronic image capture device, and graph 504 represents the two-dimensional (2D) corrections applied by an OIS system of the primary camera. Axes system 506 indicates that the vertical axis, x, represents movement in an arbitrary axial direction, and the horizontal axis, t, represents the passage of time (e.g., during the capture of an image stream) from left to right. (It is to be understood that OIS corrections could also be made in more than two dimensions, and that FIG. 5 is merely illustrative of the general concepts described herein.)

As described above, for cameras employing OIS systems, it may be desired to account for the lens corrections made by the OIS system of the primary camera (508) when determining an unstabilized trajectory for the primary camera (510). In some embodiments, accounting for the lens corrections made by the OIS system of the primary camera 508 may comprise modeling the effect of the OIS system (and/or other physical camera adjustments) as quaternions, so that they may be easily combined with one or more quaternions representing the movement of the image capture device (e.g., 3D movement information, as captured by a gyrometer, accelerometer, and/or IMU), such that the same (or similar) algorithms may be used for the stabilization operations applied to the OIS data and the image capture device movement data (512). Next, the unstabilized trajectory for the primary camera may be stabilized, using one or more desired stabilization operations (512), resulting in a primary camera image stream stabilized trajectory (514) being calculated, which may be used in the stabilization of the secondary camera, as will be described in further detail below.

Moving to the lower-left portion of FIG. 5, concurrently with the capture of the primary camera image stream, graph 520 represents the three-dimensional (3D) motion of a secondary camera of the electronic image capture device, and graph 518 represents the two-dimensional (2D) corrections applied by an OIS system of the secondary camera. As discussed above with reference to the primary camera, it may be desired to account for the lens corrections made by the OIS system of the secondary camera (520) when determining an unstabilized trajectory for the secondary camera (522). Note that, as illustrated in FIG. 5, the OIS system of the second camera may have applied a different amount of OIS to the secondary camera (518) than the OIS system of the primary camera applied to the primary camera (504)—even while experiencing the same user hand shake during the capture of the respective image streams—e.g., due to the cameras having different pixel sizes, lens travel ranges, OIS strokes, etc.

Next, the process may obtain (as shown via line 524) the primary camera image stream stabilized trajectory (514) and, at 526, stabilize the trajectory of the secondary camera using the obtained primary camera image stream stabilized trajectory (514), while accounting for any differences in pose, parallax, and/or any other camera module-based difference between the primary and secondary cameras. In some embodiments, the secondary camera image stream stabilized trajectory (528) may be derived to match the stabilized trajectory for the primary camera (514), i.e., as opposed to matching the actual corrections (e.g., transforms, rotations, etc.) that were applied to the primary camera image stream during stabilization.

Exemplary Multi-Camera Video Image Stabilization Method

Figure 6:
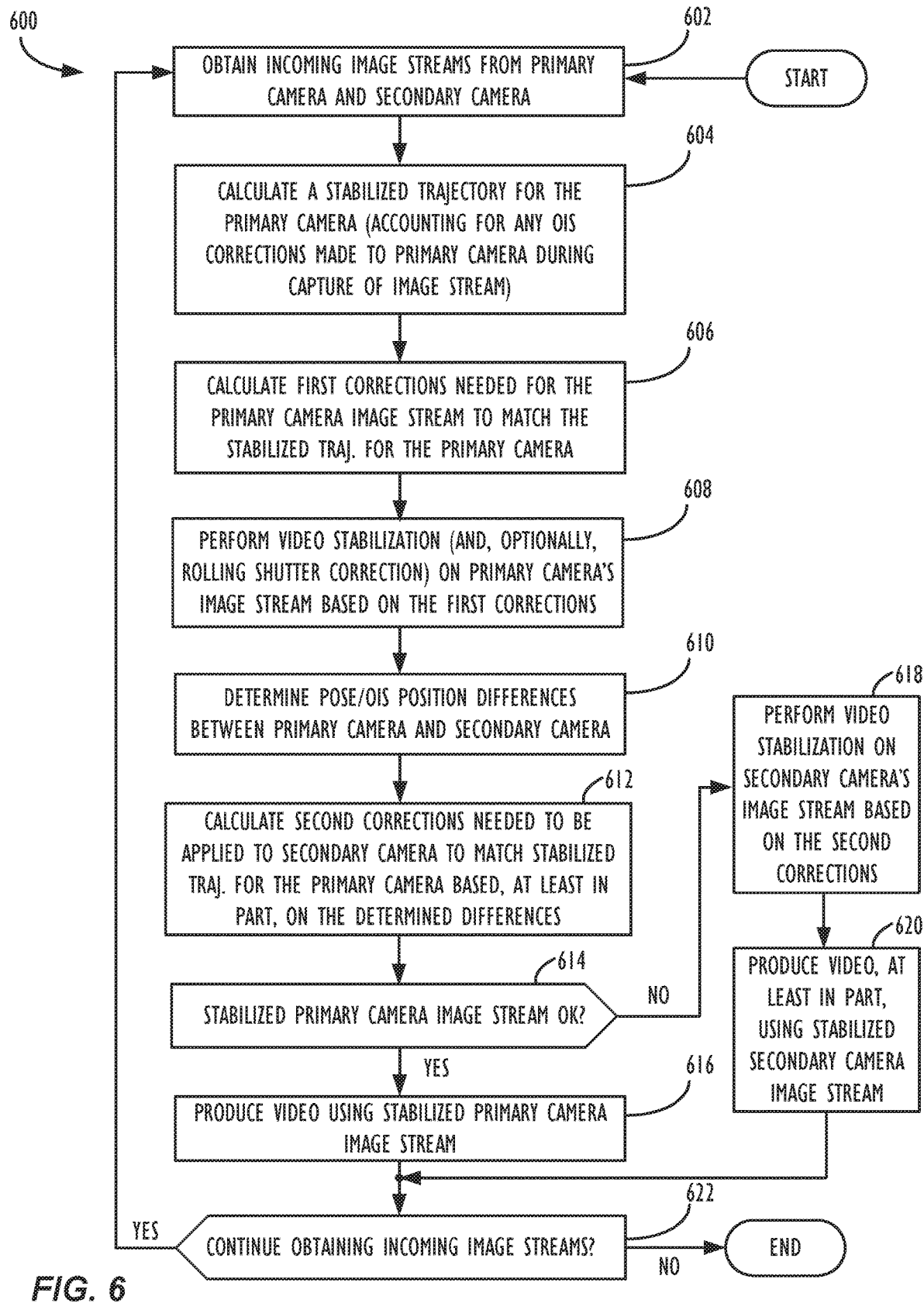
FIG. 6 is a flowchart illustrating exemplary multi-camera electronic image capture device video stabilization techniques, in accordance with one or more embodiments.

Referring now to FIG. 6, a flowchart illustrating a method 600 for performing exemplary multi-camera electronic image capture device video stabilization techniques is shown, in accordance with one or more embodiments. First, at Step 602, method 600 may begin by obtaining incoming image streams from each of a first (i.e., "primary") and second (i.e., "secondary") camera of an electronic image capture device. As mentioned above, the primary and secondary cameras of the electronic image capture device may have different poses, wherein each pose comprises one or more of: a camera position and a camera orientation. As may be understood, the pose of a given camera of an electronic image capture device may change over time as images are being captured, e.g., as caused by the movements applied to the camera by an OIS system. The primary and secondary cameras also may have one or more different properties, which may cause the respective images captured by the primary and secondary cameras to have different characteristics. Such camera properties may include, e.g., FOV, focal length, OIS systems, zoom capabilities, etc.

At Step 604, method 600 may calculate a stabilized trajectory for the primary camera. As explained above, according to some embodiments, the stabilized trajectory calculated form the primary camera may take into account any OIS corrections already made to the primary camera during the capture of the first image stream, e.g., to avoid inadvertently "over-correcting" for movement of the camera during the capture of the image stream that have already been canceled out by a camera's respective OIS system(s).

Next, at Step 606, method 600 may calculate a first set of corrections, e.g., in the form of transformations, rotations, etc., that are needed in order for the primary camera image stream to match the stabilized trajectory for the primary camera calculated in Step 604. The first set of corrections may be determined using any desired video stabilization technique, e.g., one or more of the tunable video stabilization strength parameter-based techniques described above. At Step 608, video stabilization may be applied to the primary camera's image stream based on the first set of corrections calculated at Step 606. According to some embodiments, one or more rolling shutter correction operations may also be performed on the primary camera image stream, if desired.

At Step 610, one or more differences may be determined between the primary camera and secondary camera, e.g., in terms of pose and/or position of OIS system during the capture of the respective cameras' image streams. As described above, according to some embodiments, the differences between the poses of the primary and secondary cameras may comprise one or more of: camera rotation; optical center; or parallax. In other embodiments, determining the differences between the poses of the primary and secondary cameras may comprise determining: one or more static camera alignment differences between the primary camera and the secondary camera; and/or determining one or more differences in lens position changes caused by respective OIS systems of the primary and/or secondary cameras during the capture of the first and second image streams.

At Step 612, based, at least in part, on the differences that were determined at Step 610, a second set of corrections to be applied to the secondary camera's stream of images may be derived, wherein the second set of correction are derived to match the calculated stabilized trajectory for the primary camera.

At Step 614, if the stabilized primary camera image stream is OK, e.g., as determined by evaluating whether the stabilized stream of images meets a first stabilization criterion (i.e., "YES" at Step 614), the method 600 may proceed to Step 616 and produce a resultant stabilized video stream using the stabilized version of the primary camera's image stream. Next, at Step 622, the method may determine whether to continue to obtain incoming image streams. If additional image streams are to be obtained (i.e., "YES" at Step 622), the method 600 may return to Step 602. If, instead, it is not desired to continue to obtain incoming image streams (i.e., "NO" at Step 622), the method 600 may terminate.

According to some embodiments, the stabilization criterion evaluated at Step 614 may comprise a determination of whether an object of interest (e.g., person, face, landmark, pet, inanimate object, etc.) is entirely contained in the frames of the stabilized primary camera image stream. For example, if part of a person's body (e.g., an arm) is missing, due to the extending beyond the field of view of the stabilized primary camera image stream, this may represent an unacceptable result to the user. In such instances, the stabilized image stream from the secondary camera (which may, e.g., have a wider FOV and/or more overscan available than the primary camera) may contain the person of interest's missing arm from the stabilized primary camera image stream. In other embodiments, the stabilization criterion may comprise a determination of whether a desired FOV has been achieved in the stabilized primary camera image stream.

In still other embodiments, the stabilization criterion may comprise determining whether or not a user has indicated a desire to use (or at least view) the stabilized image stream from the secondary camera. For example, a user may attempt to apply a large amount of rotation correction to the stabilized image stream from the primary camera (e.g., to level the horizon of a poorly-oriented video), in which case the stabilized image stream from the secondary camera could be used to preserve the FOV of the original stabilized image stream from the primary camera—even after making the user's desired rotation adjustment.

In yet other embodiments, a post-processing analysis of the stabilized image stream from the primary camera may determine that a stabilization criterion had not been met because the produced video could be stabilized more aggressively to produce better results, in which case the stabilized image stream from the secondary camera could be used to preserve the similar FOV as the stabilized image stream from the primary camera—but with greater stability than was possible during real-time capture using the primary camera.

Thus, as explained above, in certain situations, the stabilized image stream from the secondary camera may be used, at least in part, in the production of the resultant stabilized video stream. For example, in some instances, the stabilized image stream from the secondary camera may be combined (at least in part) with the stabilized image stream from the primary camera (e.g., with the stabilized image stream from the second camera only being used in those regions where the object of interest was not fully contained within the frame of the stabilized image stream from the primary camera). In other embodiments, the stabilized image stream from the secondary camera may be used to completely replace the stabilized image stream from the primary camera (along with any desired cropping, rotation, reframing, etc., for example, to approximate the original FOV of the primary camera). In still other embodiments, both the stabilized stream of images from the primary camera and the stabilized stream of images from the secondary camera may be stored in a common file structure in the electronic image capture device's memory. In such embodiments, users may be given a choice (e.g., via a togglable user interface option) to select whether to view the stabilized stream of images from the primary camera, the stabilized stream of images from the secondary camera, or a video stream formed from a combination of the stabilized primary and secondary streams of images.

Returning to Step 614, if the stabilized primary camera image stream is not OK, e.g., based on a determination that the stabilized stream of images does not meet a first stabilization criterion (i.e., "NO" at Step 614), the method 600 may proceed to Step 618 to perform video stabilization on the secondary camera's image stream based, at least in part, on the second set of corrections calculated at Step 612. Then, at Step 620, the resultant stabilized video stream may be produced, at least in part, using the stabilized image stream from the secondary camera, e.g., as described in the various examples above. Finally, at Step 622, the method may determine whether to continue to obtain incoming image streams. If additional image streams are to be obtained (i.e., "YES" at Step 622), the method 600 may return to Step 602. If, instead, it is not desired to continue to obtain incoming image streams (i.e., "NO" at Step 622), the method 600 may terminate.

In some embodiments, variations of method 600 illustrated in FIG. 6 may be employed. For example, in some instances, video stabilization may be performed on the secondary camera's image stream whether or not the stabilized primary camera image stream is deemed as being "OK" at Step 614. In some such instances, the secondary camera's image stream may be stabilized as it is being captured. In other instances, the corrections needed to stabilize the secondary camera's image stream may be calculated during capture, and then stored for potential later application. In still other instances, the secondary camera may not even capture an image stream (e.g., based on scene lighting levels, focus issues, occlusions, etc.), in which case the option to perform video stabilization on the secondary camera's images stream at Steps 618 and 620 would not be available.

Figure 7:
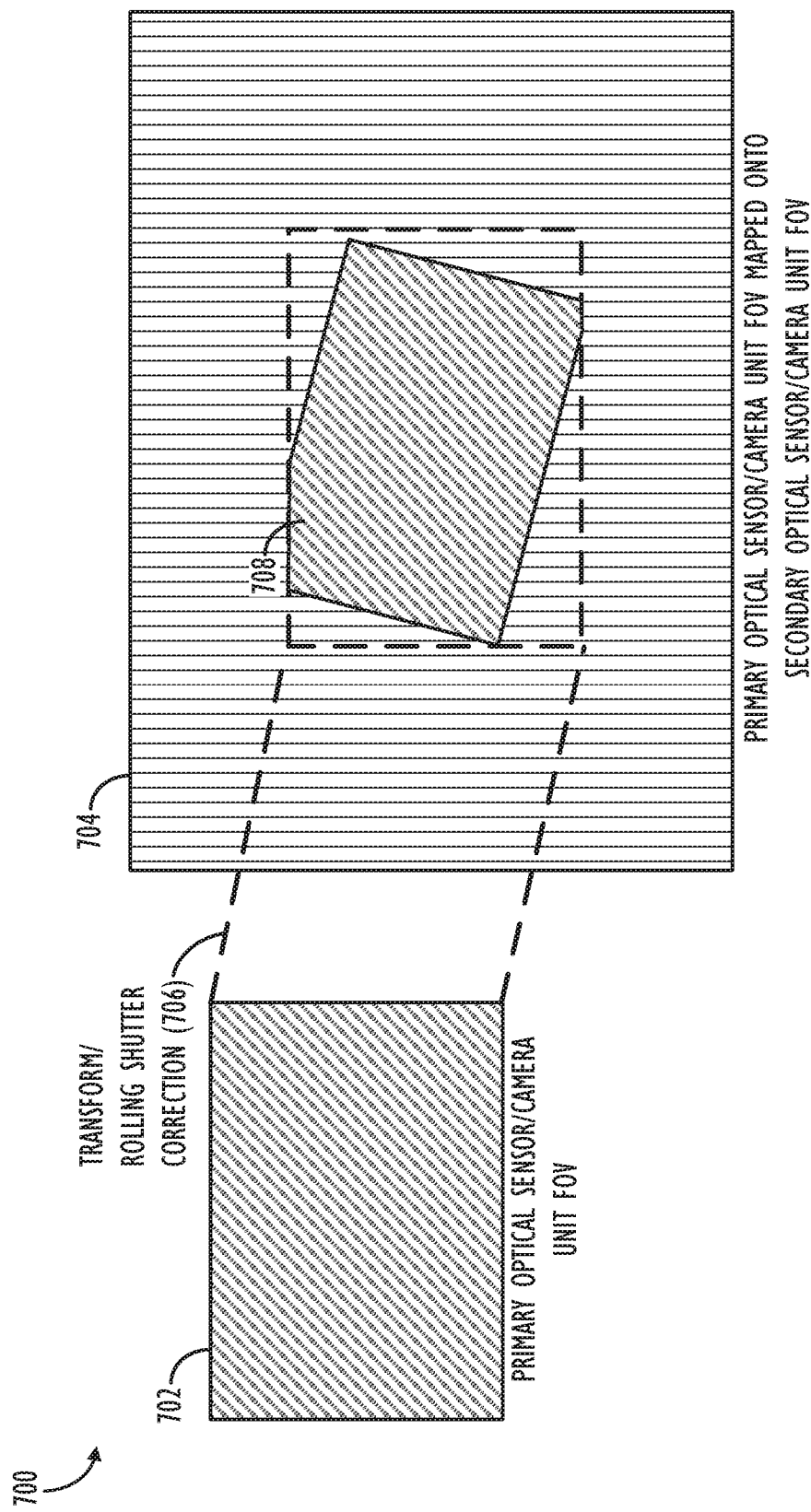
FIG. 7 illustrates exemplary differences in pose and camera properties between primary and secondary cameras of a multi-camera electronic image capture device, in accordance with one or more embodiments.

Referring now to FIG. 7, exemplary differences 700 in pose and camera properties between primary and secondary cameras of a multi-camera electronic image capture device are illustrated, in accordance with one or more embodiments. As illustrated in FIG. 7, image frame 702 represents an image frame captured by the primary camera's optical sensor/camera unit, and image frame 704 represents an image frame captured by the secondary camera's optical sensor/camera unit. As illustrated, the secondary camera's FOV is larger (and subsumes) the primary camera's FOV. As such, in order to map images captured by the primary camera onto images captured by the secondary camera, one or more transformations (e.g., rotations, translations) and/or rolling shutter correction operations (e.g., skewing) 706 may be applied to one or more both of the primary and secondary image streams. Image frame 708 represents the image frame 702 captured by the primary camera's optical sensor/camera unit after the one or more transformations and/or rolling shutter correction operations 706 have been applied to map onto image frame 704 captured by the secondary camera.

As may be understood, different image sensors within an electronic image capture device may have different readout speeds, different numbers of rows of pixels, difference FOVs, different focal lengths, etc. As such, rolling shutter correction operations may need to be applied independently on each camera unit, e.g., before, during, or after video stabilization operations are applied.

Exemplary Electronic Devices

Figure 8:
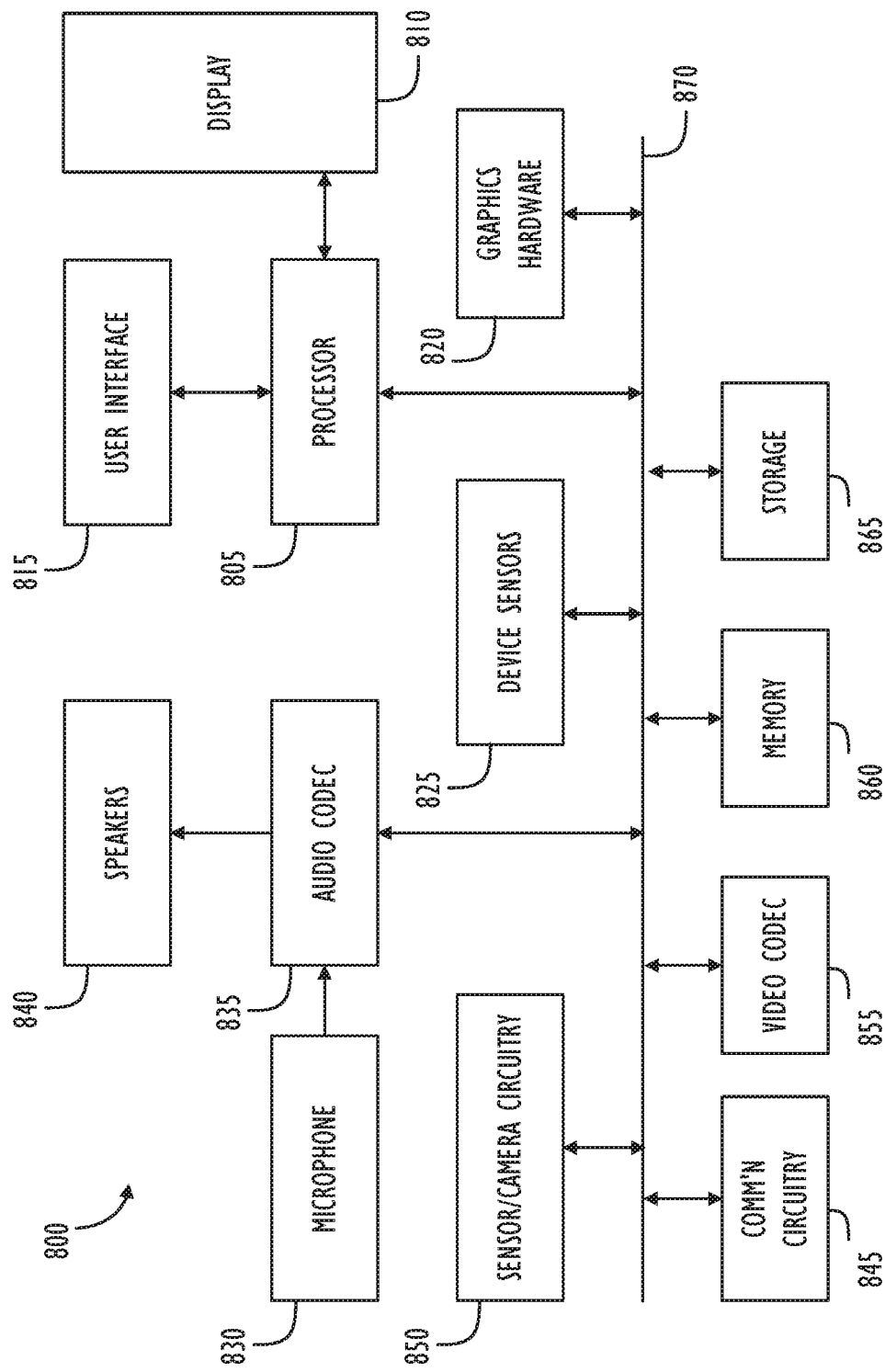
FIG. 8 shows, in block diagram form, a multi-function electronic device, in accordance with one or more embodiments.

Referring now to FIG. 8, a simplified functional block diagram of illustrative electronic device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805 may execute instructions necessary to carry out or control the operation of many functions performed by device 800 (e.g., such as the generation and/or processing of video image frames in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a stabilized video image stream and/or indicate which particular video stream(s) the user would like to have a stabilization applied to (e.g., by clicking on a physical or virtual button on the device's display screen). In one embodiment, display 810 may display a video stream as it is captured, while processor 805 and/or graphics hardware 820 and/or image capture circuitry contemporaneously generate a stabilized version of the captured video stream storing the stabilized video stream in memory 860 and/or storage 865. In another embodiment, display 810 may display a stabilized version of a captured video sequence as it is captured (with a delay approximately equal to the buffer system initialization time). Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may capture video images that may be processed to generate stabilized video in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, various stabilization regimes may be used together. In one or more embodiments, one or more of the disclosed steps in a process may be omitted, repeated, and/or performed in a different order than that described herein. Accordingly, the specific arrangement of steps or actions shown in FIG. 6 should not be construed as limiting the scope of the disclosed subject matter. The scope of the invention therefore should be determined with reference to the appended claims, along with the full scope of equivalents to which such claims are entitled.

The invention claimed is:

1. A non-transitory program storage device comprising instructions stored thereon to cause one or more processors to:
   obtain a first stream of images from a first camera of an electronic image capture device, wherein the first camera has a first pose and a first set of camera properties;
   obtain a second stream of images from a second camera of the electronic image capture device, wherein the second camera has a second pose and a second set of camera properties, and wherein at least a portion of the second stream of images are captured concurrently with the first stream of images;
   calculate a first stabilized trajectory for the first stream of images;
   calculate a first set of corrections to be applied to the first stream of images to match the first stabilized trajectory;
   stabilize the first stream of images using the first set of corrections;
   determine differences between the first pose and the second pose during the capture of the first and second streams of images;
   calculate a second set of corrections to be applied to the second stream of images to match the first stabilized trajectory based, at least in part, on the determined differences; and
   stabilize the second stream of images using the second set of corrections, wherein the instructions to stabilize the second stream of images are executed in response to a determination that the stabilized first stream of images does not meet a first stabilization criterion.

2. The non-transitory program storage device of claim 1,
   wherein the first pose comprises a first camera position and a first camera orientation,
   wherein the second pose comprises a second camera position and a second camera orientation, and
   wherein the first pose is different than the second pose.

3. The non-transitory program storage device of claim 1,
   wherein the first set of camera properties comprises one or more of: an indication of a presence or status of an Optical Image Stabilization (OIS) system for the first camera; a field of view (FOV) of the first camera; a focal length of the first camera; or a zoom level of the first camera,
   wherein the second set of camera properties comprises one or more of: an indication of a presence or status of an OIS system for the second camera; a FOV of the second camera; a focal length of the second camera; or a zoom level of the second camera, and wherein at least one property in the first set of camera properties has a different value than a corresponding property in the second set of camera properties.

4. The non-transitory program storage device of claim 1, wherein the instructions to determine differences between the first pose and the second pose during the capture of the first and second streams of images further comprise instructions to:
   determine differences between the first and second cameras in one or more of: camera rotation; optical center; or parallax.

5. The non-transitory program storage device of claim 1, wherein the instructions to calculate a first stabilized trajectory further comprise instructions to:
   calculate a first stabilized trajectory that takes into account any corrections applied by an OIS system for the first camera during the capture of the first stream of images.

6. The non-transitory program storage device of claim 1, wherein the instructions to stabilize the first stream of images using the first set of corrections further comprise instructions to:
   perform a rolling shutter correction operation on the first stream of images.

7. The non-transitory program storage device of claim 1, wherein the instructions to determine differences between the first pose and the second pose during the capture of the first and second streams of images further comprise instructions to:
   determine one or more static camera alignment differences between the first camera and the second camera; and
   determine one or more differences in lens position changes caused by respective OIS systems of the first or second cameras during the capture of the first and second image streams.

8. A video stabilization method, comprising:
   obtaining a first stream of images from a first camera of an electronic image capture device, wherein the first camera has a first pose and a first set of camera properties;
   obtaining a second stream of images from a second camera of the electronic image capture device, wherein the second camera has a second pose and a second set of camera properties, and wherein at least a portion of the second stream of images are captured concurrently with the first stream of images;
   calculating a first stabilized trajectory for the first stream of images;
   calculating a first set of corrections to be applied to the first stream of images to match the first stabilized trajectory;
   stabilizing the first stream of images using the first set of corrections;
   determining differences between the first pose and the second pose during the capture of the first and second streams of images;
   calculating a second set of corrections to be applied to the second stream of images to match the first stabilized trajectory based, at least in part, on the determined differences; and
   stabilizing the second stream of images using the second set of corrections, wherein the act of stabilizing the second stream of images is performed in response to a determination that the stabilized first stream of images does not meet a first stabilization criterion.

9. The video stabilization method of claim 8,
   wherein the first set of camera properties comprises one or more of: an indication of a presence or status of an Optical Image Stabilization (OIS) system for the first camera; a FOV of the first camera; a focal length of the first camera; or a zoom level of the first camera,
   wherein the second set of camera properties comprises one or more of: an indication of a presence or status of an OIS system for the second camera; a FOV of the second camera; a focal length of the second camera; or a zoom level of the second camera, and
   wherein at least one property in the first set of camera properties has a different value than a corresponding property in the second set of camera properties.

10. The video stabilization method of claim 8, wherein determining differences between the first pose and the second pose during the capture of the first and second streams of images further comprises:
    determining differences between the first and second cameras in one or more of: camera rotation; optical center; or parallax.

11. The video stabilization method of claim 8, wherein calculating a first stabilized trajectory further comprises:
    calculating a first stabilized trajectory that takes into account any corrections applied by an OIS system for the first camera during the capture of the first stream of images.

12. The video stabilization method of claim 8, wherein stabilizing the first stream of images using the first set of corrections further comprises:
    performing a rolling shutter correction operation on the first stream of images.

13. The video stabilization method of claim 8, wherein determining differences between the first pose and the second pose during the capture of the first and second streams of images further comprises:
    determining one or more static camera alignment differences between the first camera and the second camera; and
    determining one or more differences in lens position changes caused by respective OIS systems of the first or second cameras during the capture of the first and second image streams.

14. An electronic image capture device, comprising:
    a first camera, wherein the first camera has a first pose;
    a second camera, wherein the second camera has a second pose;
    a memory;
    one or more processors operatively coupled to the memory and configured to execute instructions causing the one or more processors to:
    obtain a first stream of images from the first camera;
    obtain a second stream of images from the second camera, wherein at least a portion of the second stream of images are captured concurrently with the first stream of images;
    calculate a first stabilized trajectory for the first stream of images;
    calculate a first set of corrections to be applied to the first stream of images to match the first stabilized trajectory;
    stabilize the first stream of images using the first set of corrections;

determine differences between the first pose and the second pose during the capture of the first and second streams of images;

calculate a second set of corrections to be applied to the second stream of images to match the first stabilized trajectory based, at least in part, on the determined differences; and stabilize the second stream of images using the second set of corrections, wherein the instructions to stabilize the second stream of images are executed in response to a determination that the stabilized first stream of images does not meet a first stabilization criterion.

15. The electronic image capture device of claim 14, wherein the first pose comprises a first camera position and a first camera orientation, wherein the second pose comprises a second camera position and a second camera orientation, and wherein the first pose is different than the second pose.

16. The electronic image capture device of claim 14, wherein the instructions to determine differences between the first pose and the second pose during the capture of the first and second streams of images further comprise instructions to:

determine differences between the first and second cameras in one or more of: camera rotation; optical center; or parallax.

17. The electronic image capture device of claim 14, wherein the instructions to calculate a first stabilized trajectory further comprise instructions to:

calculate a first stabilized trajectory that takes into account any corrections applied by an OIS system for the first camera during the capture of the first stream of images.

18. The electronic image capture device of claim 14, wherein the instructions to stabilize the first stream of images using the first set of corrections further comprise instructions to:

perform a rolling shutter correction operation on the first stream of images.

19. The electronic image capture device of claim 14, wherein the instructions to determine differences between the first pose and the second pose during the capture of the first and second streams of images further comprise instructions to:

determine one or more static camera alignment differences between the first camera and the second camera; and determine one or more differences in lens position changes caused by respective OIS systems of the first or second cameras during the capture of the first and second image streams.

20. The electronic image capture device of claim 14, wherein the instructions further comprise instructions to:

store the stabilized first stream of images and the stabilized second stream of images in a common file structure in the memory.

* * * * *